(12) United States Patent
Wu et al.

(10) Patent No.: US 6,961,376 B2
(45) Date of Patent: Nov. 1, 2005

(54) METHODS AND APPARATUS FOR RATE CONTROL DURING DUAL PASS ENCODING

(75) Inventors: Siu-Wai Wu, San Diego, CA (US); Vincent Liu, San Diego, CA (US); Yong He, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 648 days.

(21) Appl. No.: 10/183,196

(22) Filed: Jun. 25, 2002

(65) Prior Publication Data

US 2003/0235247 A1 Dec. 25, 2003

(51) Int. Cl.[7] .................................................. H04N 7/12
(52) U.S. Cl. .................................................. 375/240.12
(58) Field of Search ....................... 375/240.12, 240.16; 348/412.1, 416.1, 699–700; 382/236, 238

(56) References Cited

U.S. PATENT DOCUMENTS

| | | | |
|---|---|---|---|
| 5,793,425 A | | 8/1998 | Balakrishnan |
| 5,933,450 A | | 8/1999 | Ozkan et al. |
| 5,978,029 A | * | 11/1999 | Boice et al. ............ 375/240.14 |
| 6,038,256 A | | 3/2000 | Linzer et al. |
| 6,181,742 B1 | * | 1/2001 | Rajagopalan et al. ....... 375/240 |
| 6,259,733 B1 | | 7/2001 | Kaye et al. |
| 6,804,301 B2 | * | 10/2004 | Wu et al. .............. 375/240.12 |
| 2002/0044603 A1 | * | 4/2002 | Rajagopalan et al. ..... 375/240.03 |
| 2003/0235220 A1 | * | 12/2003 | Wu et al. .................... 370/535 |

FOREIGN PATENT DOCUMENTS

EP        0 804 035 A2    10/1997

OTHER PUBLICATIONS

Mioslavsky et al, "Rate control for layered video compression using matching pursuits", International Conference on Image Processing (ICIP 1999), IEEE, vol. 2, pp. 357–361, Oct. 1999.*

* cited by examiner

Primary Examiner—Vu Le
(74) Attorney, Agent, or Firm—Robert P. Marley

(57) ABSTRACT

Methods and apparatus for rate control in a dual pass encoding scheme are provided. A first pass encoder encodes alternate slices of anchor frames as I-slices and P-slices respectively in order to generate statistics for both I and P frame encoding for the same anchor frame. An initial complexity estimate for encoding a current frame is determined by the first pass encoder based on statistics from first pass encoding of the current frame and from first pass encoding of a prior encoded frame. A second pass encoder estimates an encoding complexity for the current frame based on the initial complexity and statistics from second pass encoding of the prior encoded frame. The second pass encoder then determines a bit budget for second pass encoding of the current frame based on the encoding complexity.

28 Claims, 3 Drawing Sheets

METHODS AND APPARATUS FOR RATE CONTROL DURING DUAL PASS ENCODING

BACKGROUND OF THE INVENTION

The present invention relates to an improved system and method for digital video processing. More particularly, the present invention relates to dual pass encoding rate control algorithms with look-ahead capabilities for handling unpredictable changes in video statistics, including special events such as scene changes, dissolves, fades, flashes, explosions, jerky motion, and the like. In addition, the present invention also relates to an improved statistical multiplexing algorithm having look-ahead capabilities for the handling of special events. Also disclosed is a fine-tuning bit rate control algorithm for dynamically adjusting, at the macroblock level, the quantizer level during encoding of a picture.

Digital television offers viewers high quality video entertainment with features such as pay-per-view, electronic program guides, video-on-demand, weather and stock information, as well as Internet access and related features. Video images, packaged in an information stream, are transmitted to the user via a broadband communication network over a satellite, cable, or terrestrial transmission medium. Due to bandwidth and power limitations, efficient transmission of film and video demands that compression and formatting techniques be extensively used. Protocols developed by the Motion Pictures Experts Group (MPEG) such as MPEG-1 and MPEG-2 maximize bandwidth utilization for film and video information transmission by adding a temporal component to a spatial compression algorithm.

Rate control is critical during encoding and transcoding of digital video programs in a multi-program transmission environment, where several programs are multiplexed and transmitted over a single communication channel. Since these programs share a limited channel capacity, the aggregate bit rate of the programs must be no greater than the communication channel rate. A goal of such bit rate adjustment is to meet the constraint on the total bit rate of the multiplexed stream, while also maintaining a satisfactory video quality for each program.

Commonly, it is necessary to adjust a bit rate of digital video programs that are provided, e.g., to subscriber terminals in a cable television network or the like. For example, a first group of signals may be received at a headend via a satellite transmission. The headend operator may desire to forward selected programs to the subscribers while adding programs (e.g., commercials or other content) from a local source, such as storage media or a local live feed. Additionally, it is often necessary to provide the programs within an overall available channel bandwidth. It may also be desired to change the relative quality level of a program by allocating more or fewer bits during encoding or transcoding.

Accordingly, the statistical multiplexer (statmux), or encoder, which includes a number of encoders for encoding uncompressed digital video signals at a specified bit rate, has been developed. The statistical remultiplexer (statremux), or transcoder, which handles pre-compressed video bit streams by re-compressing them at a specified bit rate, has also been developed. Moreover, functions of a statmux and statremux may be combined when it is desired to transcode pre-compressed data while also coding uncompressed data for transport in a common output bitstream. Uncompressed programs are coded for the first time, while compressed programs are re-encoded, typically at a different bit rate.

These statmux and statremux devices evaluate statistical information of the source video that is being encoded, and allocate bits for coding the different video channels accordingly. For example, video channels that have hard-to-compress video, such as a fast motion scene, can be allocated more bits, while channels with relatively easy to compress scenes, such as scenes with little motion, can be allocated fewer bits.

For MPEG applications, a statmux or statremux must accommodate three different picture or frame types (i.e. I, P and B frames), which usually require quite different numbers of bits because of the different nature of their temporal processing. Each individual image in a sequence of images on film or video is referred to as a frame. Each frame is made up of a large number of picture elements (pixels) that define the image. Within each frame, redundant pixels describe like parts of a scene, e.g. a blue sky. Various types of compression algorithms have been used to remove redundant spatial elements thereby decreasing the bandwidth requirements for image transmission. Sequences of frames on film or video often contain pixels that are very similar or identical. In order to maximize bandwidth utilization, compression and motion compensation protocols, such as MPEG, are typically used to minimize these redundant pixels between adjacent frames.

Frames referenced by an encoder for the purpose of predicting motion of images within adjacent frames are called anchor frames. These anchor frames can be of type Intra-frame (I-frame) or Predicted-frame (P-frame). Groups of pixels (macroblocks) that are mapped without reference to other frames make up I-frames, while P-frames contain references to previously encoded frames within a sequence of frames. A third type of frame referred to as a Bi-directional (B-frame) contains macroblocks referred from previously encountered frames and macroblocks from frames that follow the frame being currently analyzed. This entails a type of look-ahead scheme to describe the currently analyzed image in terms of an upcoming image. Both B-frame and P-frame encoding reduce duplication of pixels by calculating motion vectors associated with macroblocks in a reference frame, resulting in reduced bandwidth requirements. MPEG-2 encoding and MPEG-1 encoding differ in their support of frame slices. Slices are consecutive groups of macroblocks within a single row defined for a frame that can be individually referenced. Typically slices are of the same type, i.e. all P-frame encoded or all I-frame encoded. The choice of encoding type for a particular frame is dependent upon the complexity of that image.

In MPEG-2 digital video systems, the complexity of a video frame is measured by the product of the quantization level used to encode that frame and the number of bits used for coding the frame. This means the complexity of a frame is not known until it has been encoded. As a result, the complexity information always lags behind the actual encoding process, which requires the buffering of a number of frames prior to encoding, thereby adding expense and complexity.

Furthermore, selection of I-frame versus P-frame encoding protocol typically requires multiple encoding passes on a single frame to determine the complexity of the encoding. If a P-frame encoding results in a greater complexity than would be realized using I-frame encoding, then I-frame encoding would be selected. Ideally, an anchor frame should be coded twice in the first pass encoder to generate the complexity measure for both I and P cases, but computational overhead typically limits such an approach. From a bandwidth utilization viewpoint, it would be most effective to code for P-frames except where the image complexity would call for I-frame encoding, e.g. at scene changes. One problem with requiring multiple encoding passes on a single frame is the increased computational complexity introduced, thereby reducing the throughput of the encoder. Another problem with this approach is the inherent inefficiency of having to encode the same frame twice.

Commonly assigned co-pending patent application Ser. No. 09/929,983 entitled "First Pass Encoding of I and P Frame Complexity For Compressed Digital Video", filed Aug. 15, 2001, incorporated herein and made a part hereof by reference, discloses an improved complexity encoding system with effective scene change detection. Co-pending patent application Ser. No. 09/929,983 discloses encoding methods and apparatus for alternately encoding both I-frame and P-frame macroblocks within a single frame. By doing so, both I and P encoding complexity can be computed without encoding the same frame twice. This arrangement allows the I-frame decision to be made at the second pass encoder instead of at the first pass encoder, thus taking advantage of a look-ahead pipeline to more effectively align the I-frames with scene changes. This method also reduces the computational encoding complexity.

It would be advantageous to provide methods and apparatus for improving rate control and statistical multiplexing using the first pass encoding process of the dual pass encoding scheme as disclosed in the aforementioned co-pending application in order to improve the handling of special events in video sequences. In particular, it would be advantageous to combine statistics from first pass encoding and second pass encoding to improve rate control. It would be further advantageous to selectively sum the bit count (complexity measure) of the frames in the look-ahead pipeline of a dual pass encoder to generate the need parameter in order to ensure that video quality does not deteriorate during transition from complex video to simple video. It would be advantageous when selectively summing the complexity measurements of the frames in the look-ahead pipeline to apply a weighting to the bit count (complexity measure) for these frames such that frames closer to the current frame receives a higher weighting. It would be still further advantageous to scale the statmux need parameter by a Scene Change Multiplier in order to improve the video quality of flashes when multiple scene changes are detected in the look ahead pipeline. Finally, it would be advantageous to provide for dynamic fine-tuning of the bit rate at a macroblock level during encoding of a picture to improve video quality.

The methods and apparatus of the present invention provide the foregoing and other advantages.

SUMMARY OF THE INVENTION

The invention provides methods and apparatus for rate control in a dual pass encoding scheme. A first pass encoder encodes alternate slices of anchor frames as I-slices and P-slices respectively in order to generate statistics for both I and P frame encoding for the same anchor frame. An initial complexity estimate for encoding a current frame is determined by the first pass encoder based on statistics from first pass encoding of the current frame and from first pass encoding of a prior encoded frame. A second pass encoder estimates an encoding complexity for the current frame based on the initial complexity and statistics from second pass encoding of the prior encoded frame. The second pass encoder then determines a bit budget for second pass encoding of the current frame based on the encoding complexity.

The invention also provides methods and apparatus for statistical multiplexing in a dual pass encoding scheme. A first pass encoder is provided for implementing a first pass encoding scheme which encodes alternate slices of anchor frames as I-slices and P-slices respectively in order to generate statistics for both I and P frame encoding for the same anchor frame. A second pass encoder determines the encoding complexity estimates for a plurality of frames in a look-ahead pipeline and sums the encoding complexity estimates of selective frames in the look-ahead pipeline to determine the initial need parameter for a current frame to be encoded. The second pass encoder computes a need parameter for encoding the current frame based on the initial need parameter. The need parameter is used by a statmux processor to determine an encoding bit rate for second pass encoding of the current frame.

In addition, fine tuning control of the bit rate at the macroblock level is provided. After each macroblock of a picture is encoded, the total bits used (i.e. the number of bits used to encode the macroblocks up to that point) is compared with the assigned bit budget. This process is repeated after each macroblock is encoded and continues until all macroblocks of a picture have been encoded. As a result, the over budget or under budget bit rate trend can be predicted dynamically during the encoding process. The quanitzer level can then be increased or decreased accordingly after encoding of each macroblock to account for the determined over budget or under budget trend.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

Figure 1:
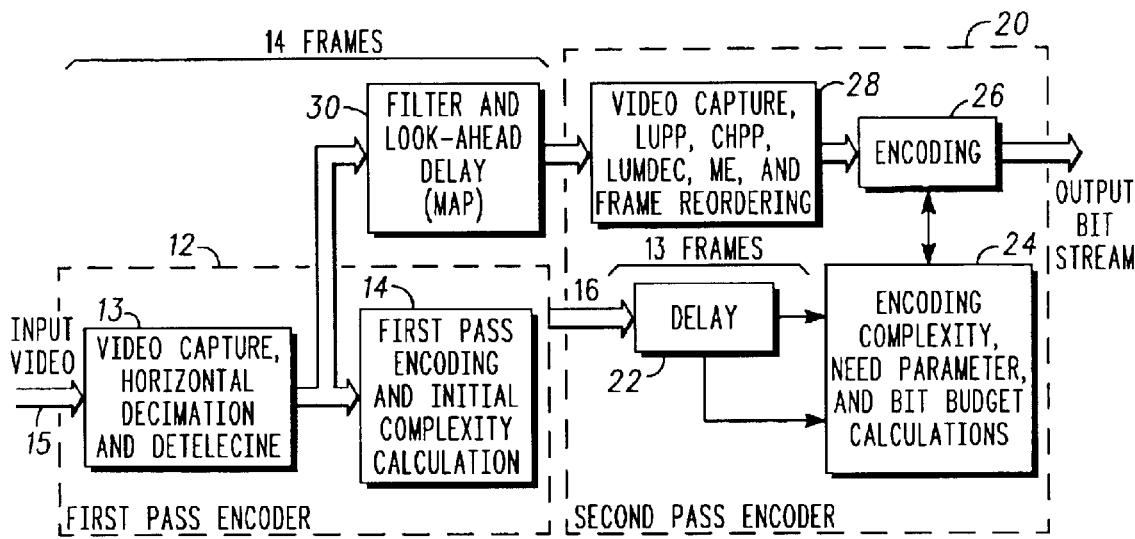
FIG. 1 shows an example of a dual pass encoding apparatus in accordance with an example embodiment of the invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

The illustrated embodiments of the invention provide both improved rate control and improved statistical multiplexing for use in a dual pass encoding scheme. In particular, the illustrated embodiments provide the following improvements:

1. combining statistics from first pass encoding and second pass encoding to improve rate control;

2. selectively summing the bit count (complexity measure) of the frames in the look-ahead pipeline of a dual pass encoder (or transcoder) to generate the need parameter to ensure that video quality does not deteriorate during transition from complex video to simple video;

3. apply a weighting on the bit count (complexity measure) of the frames in the look-ahead pipeline such that frames closer to the current frame receive a higher weighting;

4. scaling the statmux need parameter by a Scene Change Multiplier to improve the video quality of flashes when multiple scene changes are detected in the look-ahead pipeline; and 5. fine-tuning the bit rate at the macroblock level during encoding of a picture by comparing the bits used after encoding each macroblock to the assigned bit budget, and adjusting the quantizer level for the picture accordingly after each macroblock is encoded.

To aid in understanding the detailed description of the preferred embodiments, it is useful to review the prior art rate control and statistical multiplexing operations.

Rate Control

In a typical MPEG rate control algorithm such as that disclosed in ISO/IEC JTC1/SC29/WG11/N0400 (MPEG-2) "Test Model 5" (TM5), April 1993, the number of bits assigned to encode a frame is computed as:

$$BitBudget = (EncodingBitRate * N/FrameRate) * X[PictureType]/(X[I] + Nb*X[B] + Np*X[P]),$$

where N=Nominal number of frames in a GOP (Group of Pictures); Np=Nominal number of P frames in a GOP; Nb=Nominal number of B frames in a GOP; PictureType may be an I, P, or B frame. X[I], X[P] and X[B] are complexity estimates of I, B, and P frames.

In a conventional rate control algorithm, the complexity estimate is computed from statistics of encoding the previous frames, for example:

$$X[PictureType] = k[PictureType] * Q[PictureType] * R[PictureType],$$

where Q[ ] and R[ ] are respectively the average quantizer scale value and the number of bits used to encode the previous frame of the same PictureType and k[I], k[B], k[P] are empirical constant weight factors. Variations of this technique, such as that disclosed in commonly owned co-pending patent application Ser. No. 09/806,626 entitled "Method and Apparatus for Providing Rate Control in a Video Encoder", filed on Apr. 2, 2001, have been used to make the complexity estimate more stable and robust. However, due to the unpredictable nature of video, rate control schemes using only a history of encoding past frames sometimes fail to assign the correct number of bits to maintain the video quality during special events in the video such as dissolves, fade, explosions, flashes, special effects, and the like.

Dual pass encoding schemes with look-ahead capability such as that disclosed in co-pending application Ser. No. 09/929,983 were proposed to improve the rate control algorithm. In such a dual pass encoding scheme, the quantizer levels used on the first pass encoder generally do not have the same value as the quantizer levels used for actual encoding on the second pass encoder. Therefore, using the bit count produced from first pass encoding to estimate the complexity for rate control purposes, as suggested in U.S. Pat. No. 6,038,256 to Linzer, et al., may not generate satisfactory results.

The present invention provides a more accurate way to estimate the frame complexity which makes use of statistics from both the first pass encoder and the second pass encoder.

Statistical Multiplexing

In a statistical multiplexing scheme such as that disclosed in commonly owned co-pending patent application Ser. No. 09/665,373 entitled "Method and Apparatus for Determining a Bit Rate Need Parameter in a Statistical Multiplexer", filed on Sep. 20, 2000, an initial need parameter is first calculated from the complexity estimate for the GOP, then multipliers are applied to the initial need parameter to adjust for dark scene, slow motion, and the like to generate the need parameter. The statistical multiplexing algorithm then assigns an encoding bit rate to the encoder in proportion to the need parameter.

For each video frame, the estimated GOP complexity may be computed as follows:

$$\text{Initial Need Parameter} = GOP\_Complexity = Ci + (Np*Cp) + (Nb*Cb),$$

where Ci, Cb, Cp are the complexity estimate for I, P and B frames. In statistical multiplexing schemes such as co-pending application Ser. No. 09/665,373, the complexity estimates are generated from a history of past encoded frames and combined with spatial and temporal activity. No look-ahead is provided except for the current frame to be encoded.

The present invention provides an improved scheme that takes advantage of first pass encoding and a plurality of frames (e.g., up to ten) of look-ahead for generating a need parameter used in statistical multiplexing.

Inventive Rate Control Process

In an exemplary embodiment of the invention as shown in FIG. 1, a method and apparatus for rate control in a dual pass encoding scheme are provided. A dual pass encoder 10 includes a first pass encoder 12 which encodes alternate slices of anchor frames as I-slices and P-slices respectively in order to generate statistics for both I and P frame encoding for the same anchor frame. Such a first pass encoding scheme is described in detail in the aforementioned co-pending patent application Ser. No. 09/929,983. An initial complexity estimate 16 for encoding a current frame of input video 15 is determined by the first pass encoder 10 based on statistics from first pass encoding of the current frame and from first pass encoding of a prior encoded frame. A second pass encoder 20 estimates an encoding complexity for the current frame based on the initial complexity estimate and statistics from second pass encoding of the prior encoded frame. The second pass encoder 20 then determines a bit budget for second pass encoding of the current frame based on the encoding complexity.

As shown in FIG. 1, video capture, horizontal decimation, and detelecine are performed (as shown in box 13) on the input video 15 by the first pass encoder 12 as is known in the art. First pass encoding of the current frame and calculation of the initial complexity estimate is then performed by the first pass encoder 12 (as shown at box 14). The initial complexity estimate 16 is then forwarded to a buffer (Delay 22) in the second pass encoder 20, for use in determining the encoding complexity estimate for the current frame. At box 24, the second pass encoder determines the encoding complexity from the initial complexity estimate and statistics from the second pass encoding (as shown at box 26) of the prior frame. The bit budget for second pass encoding of the current frame can then be determined based on the encoding complexity (as shown at box 24). The second pass encoder 20 also performs video capture, frame reordering, motion estimation (ME), luma preprocessing (LUPP), chroma preprocessing (CHPP), and luma decimation (LUMDEC) as is known in the art. As shown, these functions are provided at box 28. The filter and look-ahead delay 30 delays the video to provide a look-ahead window for use by the second pass encoder 20.

For a particular current frame type, the statistics from the second pass encoding of the prior encoded frame used to determine the encoding complexity may comprise: (1) an average quantizer level of a last encoded frame of that same type; and (2) a number of bits generated by the last encoded frame of that same type. The initial complexity estimate for a particular current frame type may be based on: (1) a measure of the amount of compressed information generated by a first pass encoding of the current frame; and (2) a measure of the amount of compressed information generated by a first pass encoding of the last encoded frame of that same type.

When the current frame is an anchor frame, for I-frame encoding, the statistics from the second pass encoding of the prior encoded frame used to determine the encoding complexity may comprise: (1) an average quantizer level of a last encoded I-frame (Q[I]); and (2) a number of bits generated by the last encoded I-frame (R[I]). In this case, the initial complexity estimate may be based on: (1) a measure of the amount of compressed information generated by a first pass encoding of I-slices of the anchor frame (Rpass1Next[I]); and (2) a measure of the amount of compressed information generated by a first pass encoding of I-slices in the last encoded I-frame(Rpass1Last[I]). The encoding complexity (X[I]) for the I-frame encoding may be based on the formula:

$$X[I]=Q[I]*R[I]*Rpass1Next[I]/Rpass1Last[I].$$

In the scenario described above, the anchor frame may comprise a P-frame. Those skilled in the art will appreciate that there is no I-frame in a typical first pass encoding scheme, except for the initial frame after power up/reset which is not material to the invention.

Alternately, when the current frame is an anchor frame, the statistics from the second pass encoding of the prior encoded frame for use in determining the P-frame encoding complexity may comprise: (1) an average quantizer level of a last encoded P-frame (Q[P]); and (2) a number of bits generated by the last encoded P-frame (R[P]). In such a case, the initial complexity estimate may be based on: (1) a measure of the amount of compressed information generated by a first pass encoding of P-slices of the anchor frame (Rpass1Next[P]); and (2) a measure of the amount of compressed information generated by a first pass encoding of P-slices in the last encoded P-frame(Rpass1Last[P]). The encoding complexity (X[P]) for the P-frame encoding may be based on the formula:

$$X[P]=Q[P]*R[P]*Rpass1Next[P]/Rpass1Last[P].$$

In the scenario described above, the anchor frame may comprise a P-frame. When the current frame is a B-frame, the statistics from the second pass encoding of the prior encoded frame for use in determining the encoding complexity may comprise: (1) an average quantizer level of a last encoded B-frame (Q[B]); and (2) a number of bits generated by the last encoded B-frame (R[B]). In such a case, the initial complexity estimate may be based on: (1) a measure of the amount of compressed information generated by a first pass encoding of the current B-frame (Rpass1Next[B]); and (2) a measure of the amount of compressed information generated by a first pass encoding of the last encoded B-frame (Rpass1Last[B]). The encoding complexity (X[B]) of the current B-frame may be based on the formula:

$$X[B]=Q[B]*R[B]*Rpass1Next[B]/Rpass1Last[B].$$

In one example embodiment of the invention, a fixed quantizer scale may be used in the first pass encoding scheme (e.g., qscale=16). In such an embodiment, for a particular current frame type, the initial complexity estimate may be based on: (1) a number of bits generated by a first pass encoding of the current frame; and (2) a number of bits generated by a first pass encoding of the last encoded frame of that same type.

In a further example embodiment of the invention, when the current frame is an anchor frame, the second pass encoder 20 may determine an encoding complexity estimate for both I-frame encoding and P-frame encoding for the anchor frame. In such an embodiment, the second pass encoder 20 determines whether to encode the anchor frame as an I-frame or a P-frame based on a comparison of the encoding complexity estimate for the I-frame encoding and the encoding complexity estimate for the P-frame encoding.

More accurate rate control is achieved with the present invention. In particular, since the rate control process of the present invention takes into consideration statistics from both first pass encoding and second pass encoding of a prior encoded frame, special events in the video sequence can be accounted for.

Inventive Statistical Multiplexing Process

Figure 2:
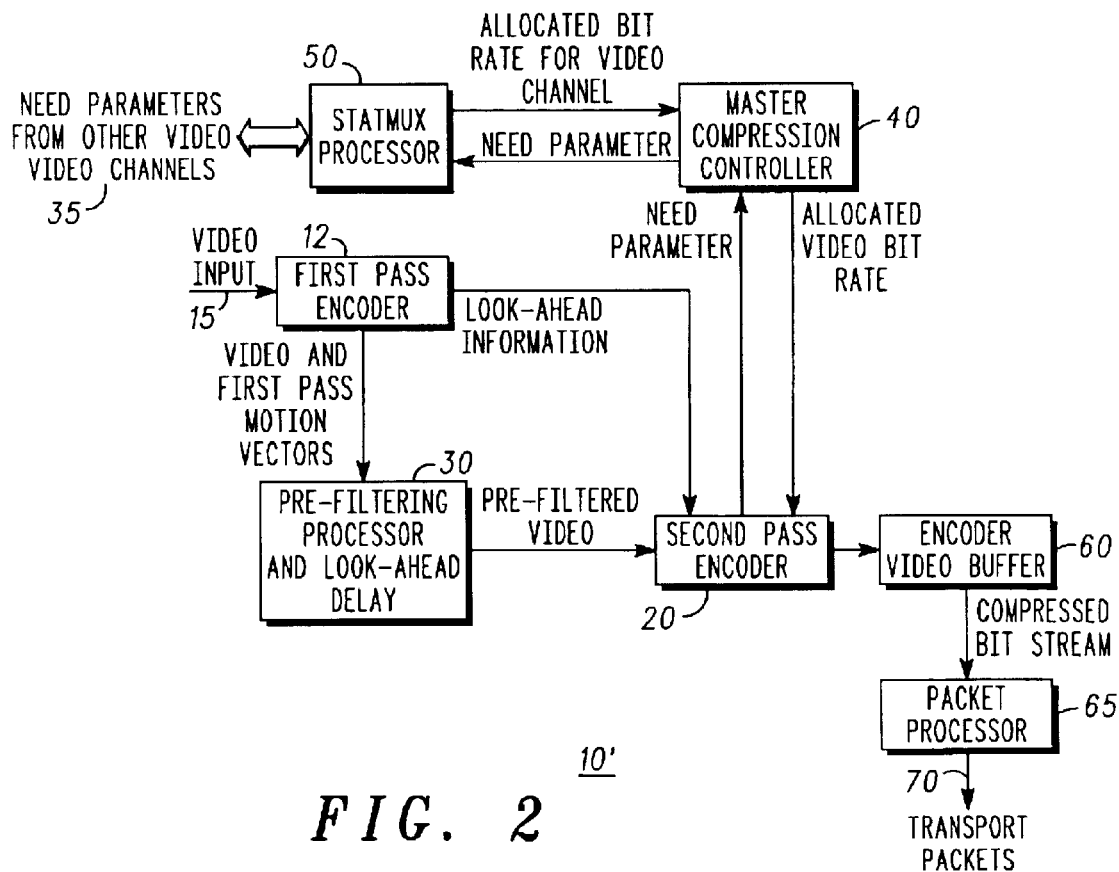
FIG. 2 shows an example statistical multiplexing architecture in a dual pass encoding scheme in accordance with an example embodiment of the invention.

In a further example embodiment of the invention as shown in FIG. 2, methods and apparatus are provided for statistical multiplexing in a dual pass encoder 10'. A first pass encoder 12 is provided for implementing a first pass encoding scheme which encodes alternate slices of anchor frames as I-slices and P-slices respectively in order to generate statistics for both I and P frame encoding for the same anchor frame. Such a first pass encoding scheme is described in detail in the aforementioned co-pending patent application Ser. No. 09/929,983. A second pass encoder 20 determines the encoding complexity estimates for a plurality of frames in a look-ahead pipeline and sums the encoding complexity estimates of selective frames in the look-ahead pipeline to determine the initial need parameter for a current frame to be encoded. A statmux processor 50 determines an encoding bit rate for second pass encoding of the current frame.

The second pass encoder 20 computes a need parameter for encoding the current frame based on the initial need parameter. The need parameter is used by the statmux processor 50 to determine the bit rate for encoding the current frame. More specifically, the statmux processor 50 receives the need parameter from the encoder 10' (e.g., via the master compression controller 40) as well as need parameters 35 from other video channels and allocates the available bandwidth among the video channels. The master compression controller 40 is a processor which controls the second pass encoder 20 in response the allocated bit rate received from the statmux processor 50. A video buffer 60 buffers the encoded video and provides the encoded video to a packet processor 65 for creating transport packets 70 of compressed video data with appropriate header information, e.g., according to the MPEG-2 or other video compression standards as is known in the art. The pre-filtering processor and look-ahead delay 30 delays the video to provide the look-ahead pipeline for use by the second pass encoder 20.

The plurality of frames in the look-ahead pipeline may comprise, for example between five and fifteen frames. However, those skilled in the art will appreciate that the look-ahead pipeline may be configured to include more than fifteen or less than five frames.

The second pass encoder 20 may apply a weighting to the encoding complexity estimates such that frames closer to the current frame receive a higher weighting than those further away from the current frame. For example, the weighting W[k] for a sequence of frames in the look-ahead pipeline having ten frames may be given by W[k]={9, 9, 9, 6, 6, 6, 3, 3, 3,1 },where k=0, 1, . . . , 9.

For each video frame, the initial need parameter may be equal to the estimated group of pictures complexity (GOP-complexity), such that Initial Need Parameter=GOP_Complexity=Ci+(Np*Cp)+(Nb*Cb), where Ci, Cp and Cb represent encoding complexity estimates for I, P and B frames, respectively and Np and Nb represent the nominal number of P and B frames in the GOP, respectively.

The encoding complexity estimate may comprise a complexity estimate for I-frame encoding (Ci). In such a case, when the current frame comprises an anchor frame, Ci may equal the initial complexity estimate generated by a first pass encoding of the current frame. When the current frame does not comprise an anchor frame, Ci may equal the initial complexity estimate generated by a first pass encoding of the next anchor frame in the look-ahead pipeline.

The second pass encoder 20 may detect a scene change in the look-ahead pipeline. In such a case, Ci may be modified by averaging the value of Ci with the initial complexity estimate of the next scene change anchor frame Ri[k] so that the modified Ci=(Ci+Ri[k])/2

Alternatively, the encoding complexity estimate may comprise a complexity estimate for P-frame encoding Cp, where Cp=Sp/Wp. Sp equals the sum of (W[k]*Rp[k]) over every anchor frame in the look-ahead pipeline that satisfies the condition Rp[k]>Rp[k'], where k' is the first anchor frame in the look-ahead window. Wp equals the sum of W[k] over every anchor frame in the look-ahead pipeline that satisfies the condition Rp[k]>Rp[k']. W[k] defines a sequence of decreasing weights for frames that are further away from the current frame, respectively, in the pipeline. Rp[k] indicates the initial complexity estimate generated by first pass encoding of the kth anchor frame in the look-ahead pipeline, where k=0, 1, 2, 3, . . . n and k=0 designates the current frame.

The encoding complexity estimate may also comprise a complexity estimate for B-frame encoding Cb, where Cb=Sb/Wb. Sb equals the sum of (W[k]*Rb[k]) over every B-frame in the look-ahead pipeline that satisfies the condition Rb[k]>Rb[k'], where k' is the first B-frame in the look-ahead window. Wb equals the sum of W[k] over every B-frame in the look-ahead pipeline that satisfies the condition Rb[k]>Rb[k']. W[k] defines a sequence of decreasing weights for frames that are further away from the current frame, respectively, in the pipeline. Rb[k] indicates the initial complexity estimate generated by first pass encoding of the kth B-frame in the look-ahead pipeline, where k=0, 1, 2, 3, . . . n and k=0 designates the current frame.

In a further example embodiment of the invention, if a scene change is detected by the first pass encoder 12, the second pass encoder 20 may scale the need parameter by a scene change multiplier. Multiple scene changes may be detected in the look-ahead pipeline. In such a case, the scene change multiplier may comprise a number greater than 1 (e.g., 1.5) in order to request more bandwidth for the frame(s) containing the scene changes. The scene change multiplier may be used to improve the video quality of flashes, which are often detected as multiple scene changes.

Additional factors other than a scene change may impact the need parameter of a particular frame, such as the activity level between frames, the amount of motion between frames, the darkness of the frame, the frame rate, and film mode detection.

The need parameter may be provided by the formula:

Need parameter=
SceneChangeMultiplier*ActivityMultiplier*LowMotion
Multiplier*DarkSceneMultiplier*FrameRate*
FilmMultiplier*InitialNeedParameter.

The ActivityMultiplier may be increased as the activity detected between frames increases. The LowMotionMultiplier may be increased where there is little motion between frames. The DarkSceneMultiplier may be increased to accommodate darker scenes. The FilmMultiplier may be increase to accommodate film mode.

In a further example embodiment of the invention, the inventive rate control scheme described above in connection with FIG. 1 may be combined with the inventive statistical multiplexing scheme described above in connection with FIG. 2. As discussed above, the initial complexity estimate 16 for encoding a current frame of video input 15 is determined by the first pass encoder 10 based on statistics from first pass encoding of the current frame and from first pass encoding of a prior encoded frame. A second pass encoder 20 estimates an encoding complexity (e.g., X[I], X[P], and X[B] discussed above) for the current frame based on the initial complexity estimate and statistics from second pass encoding of the prior encoded frame. The second pass encoder 20 may also determine a encoding complexity estimates (e.g., Ci, Cp, and Cb discussed above) for a plurality of frames in a look-ahead pipeline of the dual pass encoder. The encoding complexity estimates (e.g., Ci, Cp, and Cb) of selective frames in the look-ahead pipeline may be summed to determine the initial bit rate need parameter for a current frame to be encoded. The statmux processor 50 can then determine the allocated bit rate for second pass encoding of the current frame. The second pass encoder 20 then determines the bit budget for second pass encoding of the current frame based on the encoding complexity (e.g., X[I], X[P], and X[B]) and the allocated bit rate. Other features of the rate control process and the statmux process as discussed above may also be combined.

As can be seen from the foregoing, the inventive rate control process uses a first type of encoding complexity X[I], X[P], and X[B] for I, P and B frames, respectively, which may be based on an initial complexity estimate and statistics from second pass encoding of the prior encoded frame as discussed above, while the inventive statmux process uses a second type of complexity estimate Ci, Cp, Cb, which may be based on the number of bits generated by first pass encoding of a plurality of frames in the look-ahead pipeline as described above.

Figure 3:
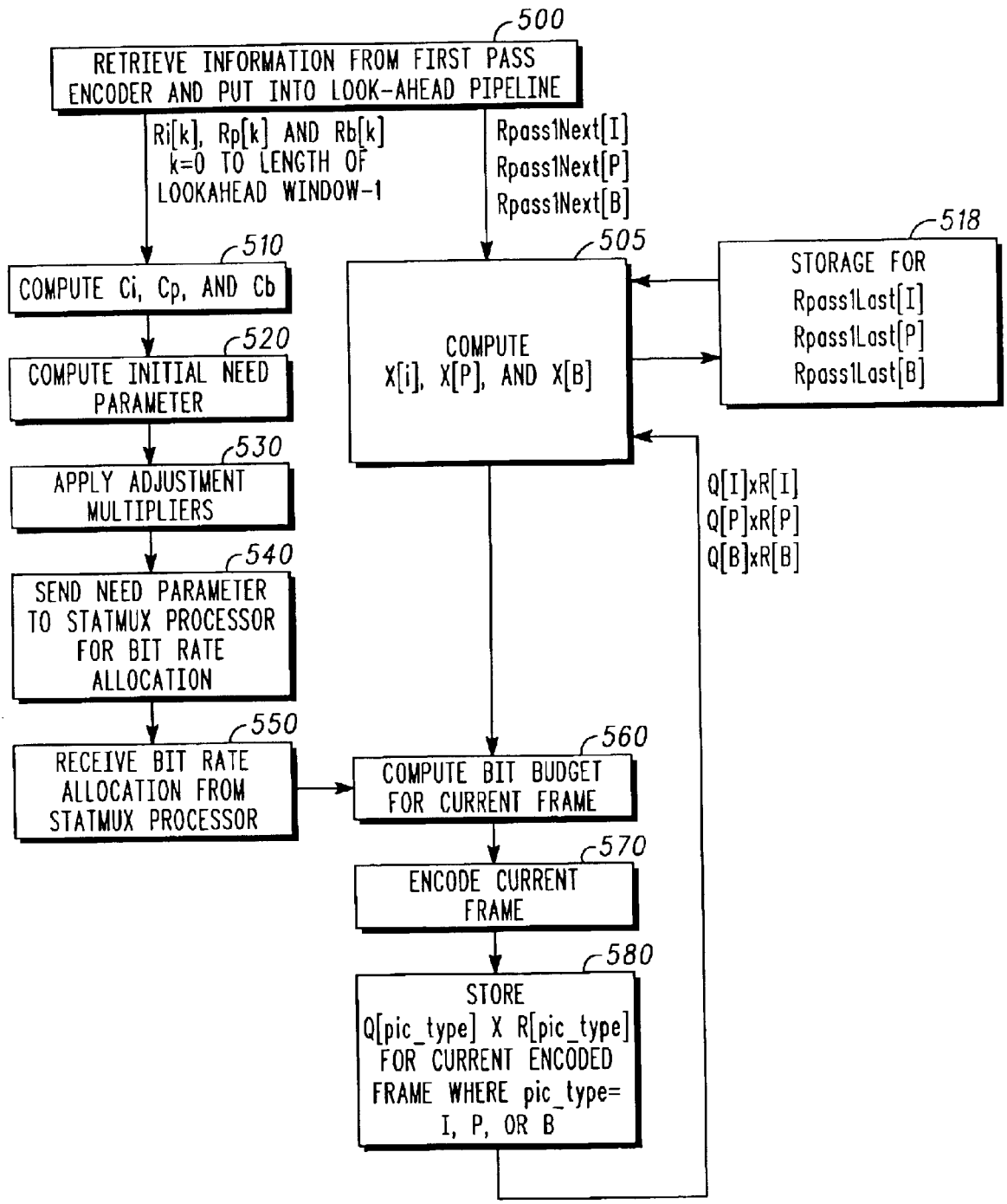
FIG. 3 shows an example flowchart of an example embodiment of the invention.

FIG. 3 is a flow diagram of the processes taking place at the second pass encoder 20 of FIGS. 1 and 2 in an example embodiment which combines certain aspects of the inventive rate control and statistical multilpexing processes. Initially, information from the first pass encoder is retrieved and placed in the look-ahead pipeline (box 500). The number of bits Ri[k], Rp[k], and Rb[k] generated by a first pass encoding of each frame k (k=0, 1, 2, 3, . . . n) in the look-ahead pipeline are used to compute the encoding complexity estimates Ci, Cp, or Cb for the current I, P, or B frame (box 510). The second pass encoder then computes the initial bit rate need parameter for encoding the current frame (box 520). Adjustment multipliers (e.g., scene change multiplier, activity multiplier, and the like as discussed above) may be applied to the initial need parameter (box 530). The need parameter, modified by the multipliers as necessary, is then sent to the statmux processor for bit rate allocation (box 540). The second pass encoder then receives the bit rate allocation from the statmux processor (box 550). The encoding complexity X[I], X[P], or X[B] for the current I, P, or B frame is computed (Box 515) based on (1) a measure of the amount of information generated by the first pass encoding of the current frame (e.g., Rpass1Next[I], Rpass1Next[P], or Rpass1Next[B]); (2) a measure of the amount of information generated by a first pass encoding of a prior I, P, or B frame (e.g., RpassLast1[I], RpassLast1[P], or RpassLast1[B] from memory (Box 518)); and (3) the product of the quantizer level of a last encoded I, P, or B frame and the number of bits generated by the last encoded I, P, or B frame: Q[I]*R[I], Q[P]*R[P], or Q[B]*R[B] (from box 580). The bit budget for encoding the current frame can then be computed based on the encoding complexity and the allocated bit rate (Box 560). The current frame is then encoded (Box 570). The quantizer level of a last encoded I, P, or B frame Q[I], Q[P], or Q[B] and the number of bits generated by the last encoded I, P, or B frame R[I], R[P], or R[B] may be stored in memory for use in determining the encoding complexity (box 580).

Inventive Fine-Tuning Bit Rate Control Process

In one example embodiment of the invention, fine tuning control of the bit rate at the macroblock level is provided which compares the total bits used with the assigned bit budget after each macroblock is encoded, thereby dynamically predicting the overbudget or underbudget trend. When encoding a picture the second pass encoder 20 encodes successive macroblocks of the current frame. The second pass encoder 20 determines the bits used in encoding each macroblock and successively sums the bits used in encoding each macroblock to determine total bits used. The second pass encoder 20 then compares, after each successive summation, the total bits used to the bit budget and adjusts a quantizer level for the current frame, as needed, based on said comparison, after each macroblock is encoded. This process continues until all macroblocks of the current frame are encoded. In this manner, fine tuning of the bit rate can be achieved during the encoding process by comparing the total bits used at each stage in the encoding process to the assigned bit budget.

In the event that the total bits used exceeds the bit budget, the second pass encoder 20 may adjust the quantizer level. The bits used for encoding a current macroblock are compared with the bits used for encoding a previous macroblock. In the event that the bits used for encoding the current macroblock is greater than the bits used for encoding the previous macroblock, the quantizer level is increased by a predetermined amount. In the event that the bits used for encoding the current macroblock is less than or equal to the bits used for encoding the previous macroblock, the quantizer level remains unchanged.

In the event that the total bits used is less than the bit budget, the second pass encoder 20 may adjust the quantizer level. The bits used for encoding a current macroblock are compared with the bits used for encoding a previous macroblock. In the event that the bits used for encoding the current macroblock is less than the bits used for encoding the previous macroblock, the quantizer level is decreased by a predetermined amount. In the event that the bits used for encoding the current macroblock is equal to or greater than the bits used for encoding the previous macroblock, the quantizer level remains unchanged.

Figure 4:
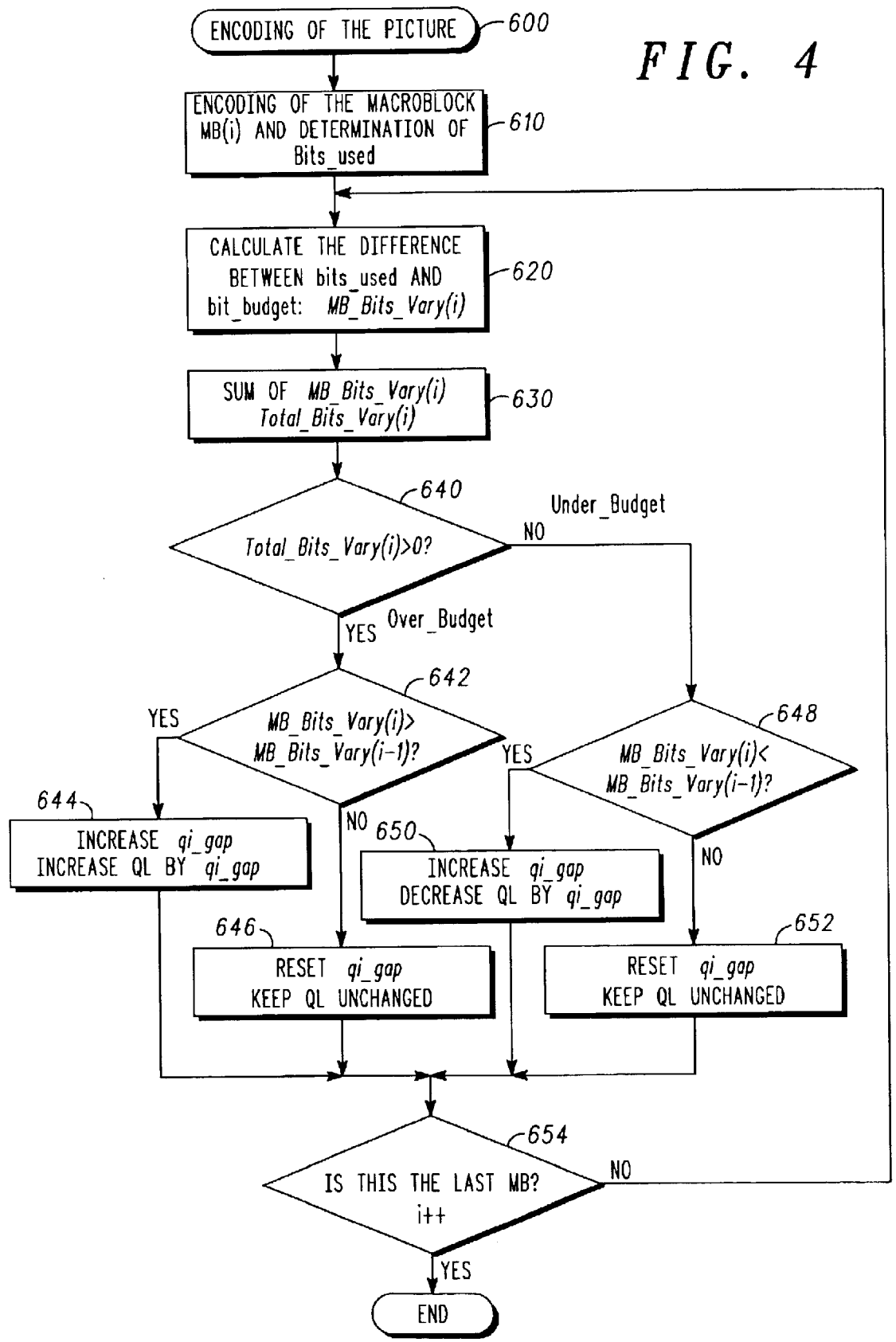
FIG. 4 shows an example algorithm for fine-tuning of the bit rate at the macroblock level in accordance with an example embodiment of the invention.

FIG. 4 shows an example embodiment of a fine tuning bit rate control algorithm in accordance with the invention. During encoding of the picture (Box 600), successive macroblocks MB(i) of the frame are encoded. The macroblock MB(i) is the current macroblock being encoded, where i denotes a current macroblock in a series of macroblocks (i=1, 2, 3, 4, . . . n) which make up the picture. The bits used (bits_used) to encode each macroblock are determined (Box 610). The difference between the bits used (bits_used) and the bit budget (bit_budget) is determined (MB_Bits_Vary (i)) after encoding each macroblock MB(i) (Box 620). After each macroblock MB(i) is encoded, the difference between the bits used and the bit budget for each macroblock (i.e. MB_Bits_Vary(i)) is added together to arrive at a difference between the total bits used to encode each macroblock and the bit budget (Total_Bits_Vary(i)) (Box 630). Total_Bits_Vary(i) is compared to zero (box 640). If the Total_Bits_Vary(i) is greater than zero, the encoder is over budget and if Total_Bits_Vary(i) the encoder is under budget.

If the encoder is over budget, the quantizer level QL may be adjusted. The bits used for encoding a current macroblock are compared with the bits used for encoding a previous macroblock (Box 642). In the event that the bits used for encoding the current macroblock is greater than the bits used for encoding the previous macroblock, the quantizer level QL is increased by a predetermined amount denoted by qi_gap (Box 644). In the event that the bits used for encoding the current macroblock is less than or equal to the bits used for encoding the previous macroblock, the quantizer level QL remains unchanged (Box 646).

The quantizer level QL may also be adjusted if the encoder is under budget. The bits used for encoding a current macroblock are compared with the bits used for encoding a previous macroblock (Box 648). In the event that the bits used for encoding the current macroblock is less than the bits used for encoding the previous macroblock, the quantizer level QL is decreased by a predetermined amount (Box 650). In the event that the bits used for encoding the current macroblock is equal to or greater than the bits used for encoding the previous macroblock, the quantizer level QL remains unchanged (Box 652).

The encoder determines whether the current macroblock is the final macroblock of the picture (box 654). If the current macroblock is not the last macroblock of the picture, the fine tuning process is repeated until all macroblocks of the picture are encoded. As indicated in FIG. 4 at boxes 644 and 650, in order to avoid rapid fluctuation of the quantizer level QL, the increase or decrease step is restricted by a maximum, denoted as qi_gap.

It should be appreciated that the present invention may be implemented in an encoder or in a transcoder. Further, those skilled in the art should appreciate that, although the present invention is described in connection with encoding "frames" of video, it is equally applicable to encoding "fields" or other portions of a video frame.

It should now be appreciated that the present invention provides advantageous methods and apparatus for rate control and statmux processing of digital video. In particular, the present invention provides advantageous rate control and statmux processing provides improved video quality in video sequences containing special events, such as scene changes, dissolves, fades, flashes, explosions, jerky motion, and the like. The present invention also provides advantageous methods and apparatus for fine tuning the bit rate during the encoding process.

Although the invention has been described in connection with various illustrated embodiments, numerous modifications and adaptations may be made thereto without departing from the spirit and scope of the invention as set forth in the claims.

What is claimed is:

1. A method for rate control in a dual pass encoding scheme, comprising the steps of:
   employing a first pass encoding scheme which encodes alternate slices of anchor frames as I-slices and P-slices respectively in order to generate statistics for both I and P frame encoding for the same anchor frame;
   determining an initial complexity estimate for encoding a current frame based on statistics from first pass encoding of the current frame and statistics from first pass encoding of a prior encoded frame;
   estimating an encoding complexity for the current frame based on said initial complexity estimate and statistics from second pass encoding of said prior encoded frame; and
   determining a bit budget for second pass encoding of said current frame based on said encoding complexity.

2. A method in accordance with claim 1, wherein, for a particular current frame type:
   said statistics from said second pass encoding of said prior encoded frame comprise:
   (1) an average quantizer level of a last encoded frame of that same type; and
   (2) a number of bits generated by the last encoded frame of that same type; and
   said initial complexity is based on:
   (1) a measure of the amount of compressed information generated by a first pass encoding of the current frame; and
   (2) a measure of the amount of compressed information generated by a first pass encoding of the last encoded frame of that same type.

3. A method in accordance with claim 1, wherein:
   said current frame is an anchor frame; and
   for I-frame encoding, said statistics from said second pass encoding of said prior encoded frame comprise:
   (1) an average quantizer level of a last encoded I-frame (Q[I]); and
   (2) a number of bits generated by the last encoded I-frame (R[I]); and
   said initial complexity estimate is based on:
   (1) a measure of the amount of compressed information generated by a first pass encoding of I-slices of said anchor frame (Rpass1Next[I]); and
   (2) a measure of the amount of compressed information generated by a first pass encoding of I-slices in the last encoded I-frame(Rpass1Last[I]).

4. A method in accordance with claim 3, wherein:
   said encoding complexity (X[I]) for said I-frame encoding is based on the formula:

$X[I]=Q[I]*R[I]*R{\rm pass1Next}[I]/R{\rm pass1Last}[I]$.

5. A method in accordance with claim 3, wherein said anchor frame comprises a P-frame.

6. A method in accordance with claim 1, wherein:
   said current frame is an anchor frame; and
   for P-frame encoding, said statistics from said second pass encoding of said prior encoded frame comprise:
   (1) an average quantizer level of a last encoded P-frame (Q[P]); and (2) a number of bits generated by the last encoded P-frame (R[P]); and
   said initial complexity estimate is based on:
   (1) a measure of the amount of compressed information generated by a first pass encoding of P-slices of a said anchor frame (Rpass1Next[P]); and
   (2) a measure of the amount of compressed information generated by a first pass encoding of P-slices in the last encoded P-frame(Rpass1Last[P]).

7. A method in accordance with claim 6, wherein:
   said encoding complexity (X[P]) for said P-frame encoding is based on the formula:

$X[P]=Q[P]*R[P]*R{\rm pass1Next}[P]/R{\rm pass1Last}[P]$.

8. A method in accordance with claim 6, wherein said anchor frame comprises a P-frame.

9. A method in accordance with claim 1, wherein:
   said current frame is a B-frame;
   said statistics from said second pass encoding of said prior encoded frame comprise:
   (1) an average quantizer level of a last encoded B-frame (Q[B]); and (2) a number of bits generated by the last encoded B-frame (R[B]); and
   said initial complexity estimate is based on:
   (1) a measure of the amount of compressed information generated by a first pass encoding of the current B-frame (Rpass1Next[B]); and (2) a measure of the amount of compressed information generated by a first pass encoding of the last encoded B-frame (Rpass 1Last[B]).

10. A method in accordance with claim 9, wherein:
    said encoding complexity (X[B]) of said current B-frame is based on the formula:

$X[B]=Q[B]*R[B]*R{\rm pass1Next}[B]/R{\rm pass1Last}[B]$.

11. A method in accordance with claim 1, wherein:
    a fixed quantizer scale is used in said first pass encoding scheme.

12. A method in accordance with claim 11, wherein, for a particular current frame type:
    said initial complexity estimate is based on:
    (1) a number of bits generated by a first pass encoding of the current frame; and
    (2) a number of bits generated by a first pass encoding of the last encoded frame of that same type.

13. A method in accordance with claim 1, wherein said current frame is an anchor frame, further comprising:
    determining said encoding complexity estimate for both I-frame encoding and P-frame encoding for said anchor frame; and
    determining whether to encode said anchor frame as an I-frame or a P-frame based on a comparison of said encoding complexity estimate for I-frame encoding and said encoding complexity estimate for P-frame encoding.

14. A method in accordance with claim 1, further comprising:
    determining the encoding complexity estimates for a plurality of frames in a lookahead pipeline of a dual pass encoder;
    summing the encoding complexity estimates of selective frames in the look-ahead pipeline to determine an initial bit rate need parameter for a current frame to be encoded; and
    determining an allocated bit rate for second pass encoding of said current frame.

15. Apparatus for rate control in a dual pass encoding scheme, comprising:
    a first pass encoder capable of:
    encoding alternate slices of anchor frames as I-slices and P-slices respectively in order to generate statistics for both I and P frame encoding for the same anchor frame; and determining an initial complexity estimate for encoding a current frame based on statistics from first pass encoding of the current frame and from first pass encoding of a prior encoded frame; and a second pass encoder capable of:

estimating an encoding complexity for the current frame based on said initial complexity estimate and statistics from second pass encoding of said prior encoded frame; and determining a bit budget for second pass encoding of said current frame based on said encoding complexity.

16. Apparatus in accordance with claim 15, wherein, for a particular current frame type:

said statistics from said second pass encoding of said prior encoded frame comprise:

(1) an average quantizer level of a last encoded frame of that same type; and (2) a number of bits generated by the last encoded frame of that same type; and said initial complexity estimate is based on:

(1) a measure of the amount of compressed information generated by a first pass encoding of the current frame; and (2) a measure of the amount of compressed information generated by a first pass encoding of the last encoded frame of that same type.

17. Apparatus in accordance with claim 15, wherein:

said current frame is an anchor frame; and for I-frame encoding, said statistics from said second pass encoding of said prior encoded frame comprise:

(1) an average quantizer level of a last encoded I-frame (Q[I]); and (2) a number of bits generated by the last encoded I-frame (R[I]); and said initial complexity estimate is based on:

(1) a measure of the amount of compressed information generated by a first pass encoding of I-slices of said anchor frame (Rpass1Next[I]); and (2) a measure of the amount of compressed information generated by a first pass encoding of I-slices in the last encoded I-frame(Rpass1Last[I]).

18. Apparatus in accordance with claim 17, wherein:

said encoding complexity (X[I]) for said I-frame encoding is based on the formula:

$$X[I]=Q[I]*R[I]*Rpass1Next[I]/Rpass1Last[I].$$

19. Apparatus in accordance with claim 17, wherein said anchor frame comprises a P-frame.

20. Apparatus in accordance with claim 15, wherein:

said current frame is an anchor frame; and for P-frame encoding, said statistics from said second pass encoding of said prior encoded frame comprise:

(1) an average quantizer level of a last encoded P-frame (Q[P]); and (2) a number of bits generated by the last encoded P-frame (R[P]); and said initial complexity estimate is based on:

(1) a measure of the amount of compressed information generated by a first pass encoding of P-slices of a said anchor frame (Rpass1Next[P]); and (2) a measure of the amount of compressed information generated by a first pass encoding of P-slices in the last encoded P-frame(Rpass1Last[P]).

21. Apparatus in accordance with claim 20, wherein:

said encoding complexity (X[P]) for said P-frame encoding is based on the formula:

$$X[P]=Q[P]*R[P]*Rpass1Next[P]/Rpass1Last[P].$$

22. Apparatus in accordance with claim 20, wherein said anchor frame comprises a P-frame.

23. Apparatus in accordance with claim 15, wherein:

said current frame is a B-frame;

said statistics from said second pass encoding of said prior encoded frame comprise:

(1) an average quantizer level of a last encoded B-frame (Q[B]); and (2) a number of bits generated by the last encoded B-frame (R[B]); and said initial complexity estimate is based on:

(1) a measure of the amount of compressed information generated by a first pass encoding of the current B-frame (Rpass1Next[B]); and (2) a measure of the amount of compressed information generated by a first pass encoding of the last encoded B-frame(Rpass1Last[B]).

24. Apparatus in accordance with claim 23, wherein:

said encoding complexity (X[B]) of said current B-frame is based on the formula:

$$X[B]=Q[B]*R[B]*Rpass1Next[B]/Rpass1Last[B].$$

25. Apparatus in accordance with claim 15, wherein:

a fixed quantizer scale is used in said first pass encoding scheme.

26. Apparatus in accordance with claim 25, wherein, for a particular current frame type:

said initial complexity estimate is based on:

(1) a number of bits generated by a first pass encoding of the current frame; and (2) a number of bits generated by a first pass encoding of the last encoded frame of that same type.

27. Apparatus in accordance with claim 15, wherein:

said current frame is an anchor frame:

said second pass encoder determines an encoding complexity estimate for both I-frame encoding and P-frame encoding for said anchor frame; and said second pass encoder determines whether to encode said anchor frame as an I-frame or a P-frame based on a comparison of said encoding complexity estimate for said I-frame encoding and said encoding complexity estimate for said P-frame encoding.

28. Apparatus in accordance with claim 15, wherein:

said second pass encoder is capable of:

determining the encoding complexity estimates for a plurality of frames in a look-ahead pipeline of a dual pass encoder;

summing the encoding complexity estimates of selective frames in the look-ahead pipeline to determine an initial bit rate need parameter for a current frame to be encoded; and a statmux processor determines an allocated bit rate for second pass encoding of said current frame.

* * * * *